US006898707B1

(12) United States Patent
Sit et al.

(10) Patent No.: US 6,898,707 B1
(45) Date of Patent: May 24, 2005

(54) INTEGRATING A DIGITAL SIGNATURE SERVICE INTO A DATABASE

(75) Inventors: Ho Wing Sit, Moraga, CA (US); Tony F. Kinnis, Murray, KY (US)

(73) Assignee: Accela, Inc., Dublin, CA (US)

( * ) Notice: Subject to any disclaimer, the term of this patent is extended or adjusted under 35 U.S.C. 154(b) by 0 days.

(21) Appl. No.: 09/451,575

(22) Filed: Nov. 30, 1999

(51) Int. Cl.[7] ................................................. H04L 9/28
(52) U.S. Cl. ....................................... 713/167; 713/189
(58) Field of Search ................................. 713/167, 189

(56) References Cited

U.S. PATENT DOCUMENTS

| 5,208,858 | A | | 5/1993 | Vollert et al. | |
|---|---|---|---|---|---|
| 6,233,577 | B1 | * | 5/2001 | Ramasubramani et al. | 707/9 |
| 6,237,096 | B1 | * | 5/2001 | Bisbee et al. | 713/178 |

FOREIGN PATENT DOCUMENTS

| EP | 0 845 733 A2 | 11/1997 |
|---|---|---|
| EP | 0 940 945 A2 | 9/1999 |
| WO | WO 97/12460 A1 | 8/1996 |
| WO | WO 97/12460 A1 | 4/1997 |
| WO | WO 97/43717 A1 | 11/1997 |
| WO | WO 97/50036 | 12/1997 |
| WO | WO 97/50207 A1 | 12/1997 |
| WO | WO 98/20644 | 5/1998 |
| WO | WO 98/54633 | 12/1998 |
| WO | WO 99/22486 | 5/1999 |
| WO | WO 99/48243 | 9/1999 |
| WO | WO 99/57847 | 11/1999 |
| WO | WO 99/59096 | 11/1999 |

OTHER PUBLICATIONS

C.J. Date, An Introduction to Database Systems, Addison Wesley Publishing Company, 6th Edition, pp. 22–23.*
Lowry, J.: "Location–Independent Information Object Security," IEEE Comput. Soc. Press, 1995, pp. 54–62, SP002155116 Los Alamitos, CA, USA.
Kalla, et al: "Achieving non–repudiation of Web based transactions", The Journal of Systems and Software, 1999, pp. 165–175, v. 48.

* cited by examiner

Primary Examiner—Gregory Morse
Assistant Examiner—Andrew Nalven
(74) Attorney, Agent, or Firm—Stattler Johansen & Adeli LLP

(57) ABSTRACT

A digital signature service integrates digital signature functions on data, for storage in a database. The digital signature service is integrated within a remote database management system ("RDBMS"). A database client generates a command to the RDBMS to execute a stored procedure or stored function that digitally signs the data and that saves the data in a persistent datastore. In response to the command, the RDBMS, using a digital certificate for the user, generates a signature from the data. In addition, the RDBMS generates a digital signature object for the data that includes the data, certificate and signature. The digital signature object is stored in the database. The digital signature service verifies digital signatures through execution of a query command. The digital signature service also implements business logic to retrieve data based on digital signature criteria, and implements filter functions to filter the storage and retrieval of data based on verification and authentication of digital signatures. The generation of multiple signatories on a single data item is also disclosed.

21 Claims, 9 Drawing Sheets

INTEGRATING A DIGITAL SIGNATURE SERVICE INTO A DATABASE

BACKGROUND OF THE INVENTION

1. Field of the Invention

The present invention is directed toward the field of e-commerce, and more particularly to integrating a digital signature service into a database.

2. Art Background

Electronic commerce, known as "e-commerce", has become increasingly more popular with the proliferation of the Internet. In general, e-commerce involves electronic transactions between two or more parties. For example, an e-commerce transaction may be between a consumer and an on-line merchant, or an e-commerce transaction may be implemented for procurement between a company and its vendor. Regardless of the nature of the transaction, in order to promote the use of e-commerce, there is a demand for secure transactions among the parties. A secure transaction involves both the ability to verify that information, transmitted as part of the transaction, has not been altered, as well as the ability to authenticate the parties themselves. In order to provide secure transactions for use in e-commerce, digital signatures have been used.

In general, a digital signature is an encrypted electronic fingerprint. When the encrypted fingerprint is attached to a file or a document, the digital signature signifies that the owner issued the document. This characteristic of digital signatures enables the conduction of e-commerce to occur in a legal and binding manner. The process of generating a digital signature involves the use of both a certificate, particular to each individual or entity, and a signature, that constitutes a unique fingerprint of the document or file. The fingerprint, referred to as a message digest, is derived from data in the document or file being signed. The message digest is encrypted for authentication purposes using the signor's private key so that it may only be decrypted with the signor's public key. The public key is contained in the signor's certificate, and is transmitted to the recipient of the document.

In order to make the message digest legal and binding, a Certification Authority, such as Digital Signature Trust, Verisign, Entrust, and many others, acts as an independent third party, very much like a notary public. In general, the Certificate Authority issues unique certificates to individuals or entities, and, during the process of verification of a digital signature, provides the means to verify and certify that the electronic fingerprint belongs to the certificate holder.

Digital signatures use, as a security mechanism, public key cryptography. In general, with public key cryptography, the signor of a document receives a private key and public key pair. The fingerprint is encrypted with the private key, and the public key is sent to the recipient of the document to decrypt the digital signature. The private key portion of the security key pair is similar to the PIN code of your credit card. Currently, the Certification Authority issues a Certificate, using Industry Standard Organization ("ISO") X.509 standard, that encapsulates the public key portion of the private-public key pair.

Although digital signatures provide a way to authenticate documents, in practice, current software products that generate digital signatures do not permit an effective way to store, retrieve, and manipulate documents in a manner that is useful to users. The following scenario illustrates the inability to effectively use digital signatures. Suppose that John Public had a document containing very sensitive legal information regarding a contractual agreement he wished to make with ACME Company. John does not have the time to come to the ACME office with the document, so he uses his email client to digitally sign and send the document to ACME. The next morning Jane Doe, an employee at ACME, reads her email that contains John's document. She notes that the document is digitally signed and confirms that the document is from John and that the document has not been altered from its original form. However, Jane Doe now must store the document in her database to subsequently obtain proper approval from her supervisor regarding the terms of John Public's contract. Here is where the problems begin to arise. The approval person at ACME has no way of knowing that the document has not changed since Jane stored it in the company database. This example shows how the usefulness of the digital signature disappears once the document leaves the email client.

Accordingly, it is desirable to provide a means to generate digital signatures that are not specific to an application, such as an email client. As described herein, the digital signature service of the present invention is integrated into a database to provide digital signature functionality during storage and retrieval of data in the database.

SUMMARY OF THE INVENTION

A digital signature service is integrated into a database. The digital signature service provides to a user seamless integration between executing digital signature functions on data, and storing that data in a database. In one embodiment, the digital signature service is integrated within the database management system, such as a relational database management system ("RDBMS"). A database client, such as an application program, generates data for storage in a database record. Specifically, the database client generates a command to the RDBMS to execute a stored procedure or stored function that digitally signs the data and that saves the data in a persistent datastore. In response to the command, the RDBMS, using a digital certificate for the user, generates a signature from the data. In addition, the RDBMS generates a digital signature object for the data that includes the data, certificate and signature. The digital signature object is stored in the database.

The digital signature service also permits a user to verify digital signatures stored in the database. For this function, the RDMS receives a query command from the user to retrieve the data from the record of the database. In response to the query command, the RDBMS retrieves the digital signature object containing the data, certificate and signature. The RDMS processes the data and the certificate, using the signature, to verify that the data and the certificate are unaltered from their original contents. The RDBMS also obtains, from the certificate, an authentication of the digital signatory. After the digital signature verification, data is provided as a response to the query command. The digital signature service implements business logic to retrieve data based on digital signature criteria, and implements filter functions to filter the storage and retrieval of data based on verification and authentication of digital signatures. Furthermore, the digital signature service permits multiple signatories on a single data item.

DETAILED DESCRIPTION

Figure 1:
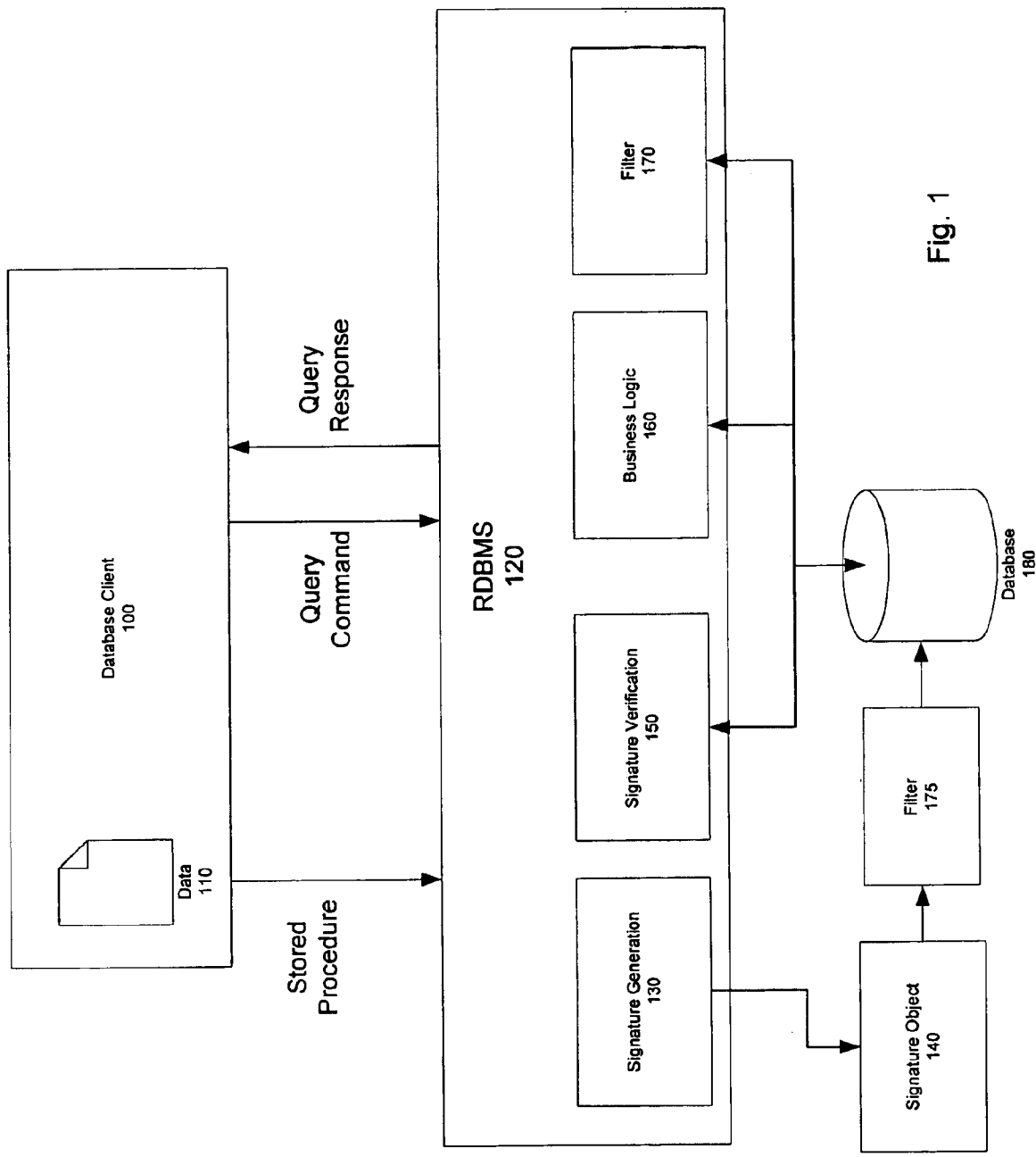
FIG. 1 is a block diagram illustrating one embodiment for integrating digital signatures into a database system.

FIG. 1 is a block diagram illustrating one embodiment for integrating digital signatures into a database system. A client database 100 uses, as at least one persistent datastore, database 180. In one embodiment, database 180 is a relational database. As is well known in the art of database technology, database 180 comprises a plurality of database tables. For this embodiment, the database tables are managed via a relational database management system ("RDMS") 120. However, the techniques of the digital signature service may be implemented in any type of database system without deviating from the spirit or scope of the invention.

In general, RDBMS 120 receives from clients, such as database client 100, data for storage in database 180. The procedure executed by the database management system (e.g., RDBMS 120) to store data in database 180 is referred to as a "stored procedure." In general, a digital signature service, integrated in the database management system, augments the "stored procedure" to digitally sign data "on-the-fly" (i.e., the system signs data as the data is stored to the database). As shown in FIG. 1, data 110, through the augmented stored procedure, is stored in database 180, and a digital signature, specific for a user of database client 100, is generated for the data 110.

For the embodiment of FIG. 1, RDBMS 120 includes signature generation 130. In general, signature generation 130 receives a command for the stored procedure for data and generates a "signature object." The signature generation 130 signs entries for any type of data stored in rows and/or columns of a database. For example, signature generation 130 signs textual data, non textual data (e.g., graphics, video, audio files, etc.), including binary large objects. Also, as shown in FIG. 1, an identification of the user is submitted (e.g., the user ID submitted at log-in to the database session), so as to provide a signatory for the digital signature (i.e., user of the database client 100). For the embodiment of FIG. 1, a signature object 140 is generated that includes the data (e.g., data 110), a digital signature, and a certificate for the user.

In order to sign data for a stored procedure, the signature generation 130 obtains information specific to the user (i.e., information for the digital signatory). In one embodiment, signature generation 130 receives the user name, as well as a password, from the user log-in procedure for the database session. Specifically, to use the database, the RDMS 120 provides security features. For this embodiment, the user is prompted by the RDMS to submit the user's name and password. As is well known in database technology, the RDMS contains tables, for use in the database system level, to store user specific data (e.g., user name, password, access control, etc). The passwords are encrypted prior to storage in the system database tables. In one embodiment, the signature generation 130 receives from the system level tables the user's name and password to sign a document. In other embodiments, the RDMS system level tables include, in addition to the user's name and password, entries for the user's private key and the user's certificate. Using the access control mechanisms of the database, only the user has access to the user's private key and certificate. During a "signed stored procedure", the RDMS accesses the system level tables to obtain the user's private key and certificate for the digital signature operation. Because the user's certificate is public (i.e., transmitted in the clear), it does not require access security for storage in the system database tables. The RDMS includes the ability to generate the key pairs and certificate for each new user on the system. Alternatively, the RDMS provides the ability to obtain a certificate from an independent agency, such as a certificate authority.

In another embodiment, to obtain the key pair and certificate, a client application passes the necessary parameters to the RDMS. In one embodiment, an application developer, developing software for use with the RDMS, defines tables in the database for storing the certificate. During a signature operation, the pre-defined tables are accessed to obtain the certificate. For the client application approach, the client application provides the appropriate private key for the signature operation. The private key may be securely stored and retrieved using several techniques. For example, an independent digital signature service, which securely manages the private key, may be implemented as a separate program with an application program interface ("API"). For this embodiment, the digital signature service API is used to pass, to the RDMS when necessary, the private key. This embodiment does not require implementing the secure key control and certificate functions directly into the database. Instead, when a signature operation is executed as part of a stored procedure or function, the private key is passed from the digital signature service to the RDMS. Similarly, to verify a digital certificate, the certificate is obtained from either a user defined table or is passed as a parameter for the verify function. One embodiment for implementing secured key management is described in U.S. patent application Ser. No., 09/375,475, entitled "A Digital Signature Service", inventors Tony F. Kinnis and Ho Wing Sit, filed Aug. 16, 1999, and is expressly incorporated herein by reference.

In one embodiment, the digital signature service is implemented for users operating under a corporation. For this embodiment, during database set-up, a root certificate under the corporate name is created. The set-up procedure also involves generating a key pair and certificate under the corporate name. When data is stored using the digital signature procedure of the present invention, the signature generation 130 uses the corporate key pair and certificate. To implement to digital signature function for personal use, the RDMS 120 stores, for each authorized user of the database, a personal key pair and approved certificate (i.e., a certificate issued by a certificate authority or issued by the company that generates its own certificates for its users). Using these techniques, a user may digitally sign data under the corporation or under the user's personal signature.

In one embodiment, the user is provided with the option of signing data, such as documents, when the data is stored to database 180. For example, if the user executes a signature transaction, the stored procedure in the RDBMS 120 may prompt the user to determine if the user desires to digitally sign the data for storage in database 180. In other embodiments, the user is not prompted, and the RDMS 120 automatically signs the data with the certificate and key pair identified through the user log-in.

In general, stored procedures are SQL commands and program statements stored in the database as a named procedure to ensure consistent implementation of commonly used operations. For example, a stored procedure may include a name, input parameters, and returns values. Typically, the stored procedure resides as part of the data dictionary, and is invoked by many users of the database. Stored procedures maintain common and optimized application routines in the database. Stored procedures also reduce the amount of network traffic for database operations because stored procedures can handle multiple tasks-such as insert, update, and delete-with a single command. After processing the request, the stored procedure returns only the results of the request rather than the numerous result sets for the individual queries. For a more complete description of a stored procedure or stored function, See Oracle 7 Server, Release 7.3 Application Developer's Guide, Copyright© 1992, 1996 Oracle® Corporation.

In addition to generating requests to store signed documents, database client 100 also generates queries, through use of query commands, to extract data from database 180. In one embodiment, the RDBMS 120 implements a standard query language ("SQL") to permit clients to extract data from database 180. However, any query language or fourth generational language ("4GL") may be used to integrate digital signatures into a database without deviating from the spirit or scope of the invention. In response to the query commands, RDBMS 120 retrieves tables from the database 180 responsive to the query.

For the embodiment of FIG. 1, RDBMS 120 further includes business logic 160, as part of the digital signature service. The business logic 160, integrated as part of the command interpreter for the RDBMS 120, (e.g., the SQL Command Interpreter), executes "business logic" based on digital signatures. Specifically, business logic 160 identifies records in the database 180 based on digital signature criteria. For example, a query command may request all documents signed by a particular signatory (e.g., all documents signed by Jane Doe). For this example, business logic 160 identifies all documents from database 180 signed by Jane Doe.

Signature verification 150, also part of RDBMS 120, authenticates the document, the user certificate used to sign the document and other business logic such as certificate expiration or revocation. For the above example, after the database system identifies all records signed by Jane Doe, signature verification 150 verifies the authenticity of the document as well as the authenticity of Jane Doe's certificate. Only the data is returned as a response to the query. The signature verification functions are transparent to the database client 100. However, if the verification procedure fails, then the client is informed that either the document is corrupted or the signatory's certificate is corrupted.

In addition, RDBMS 120, through the filters 170 and 175, filters the selection of data from database 180 and filters the storage of signed objects into database 180. Specifically, filters 170 and 175 provide filter functions based on digital signature criteria, as well as other database parameters. The filter functions include any type of function to filter signed objects prior to storage in database 180 (filter 175), and include any type of function to filter data retrieved from database 180 (filter 170). For example, filter 175 cancels database transaction to store signed objects if the user's certificate has expired, the certificate does match the current user's name etc. Further filter functions that cancel the stored procedure are described below in conjunction with the flow diagram of FIG. 6. The second filter function, filter 170, retrieves records based on search parameters. The search parameter may be a combination of traditional database parameters and digital signature related parameters. For example, an insurance company may execute a query to the database to retrieve all insurance forms "INS140" that include a digital signature signed by "John Dole."

Table 1 illustrates an example database record.

TABLE 1

| Data Type | Date Stored | User Name | Data |
| --- | --- | --- | --- |
| Textual Document | 10/17/99 | Jon Doe | Document$_X$ |
| Legal Document | 9/8/99 | Jon Doe | Legal$_A$ |
| Multi-Media | 7/9/99 | Jon Doe | Multi-Media$_A$ |

The example database record includes four columns: "Data Type", "Date Stored", "User Name", and "Data." The "Data Type" defines the type of data stored for that entry. As described above, the data may comprise a textual document, a legal document (i.e., a contract, application for permit, etc.), or a multimedia file (i.e., graphics, audio, video, etc.). The "Date Stored" field, generated from the time stamp of the stored procedure, designates the date the file was stored in the database. The "User Name" identifies the "owner" of the data. In one embodiment for the digital signature service, the user name identifies the digital signatory to the data. The last column in Table 1, designated "data", stores the data itself. For example, the first record of the table stores, a document, designated document$_x$.

Table 2 illustrates the database table of Table 1 augmented to include some of the digital signature features of the present invention.

TABLE 2

| Data Type | Date Stored | User Name (Certificate) | Data (Signed) |
| --- | --- | --- | --- |
| Textual Document | 10/17/99 | Jon Doe - Cert | Document$_X$ Signature Object |
| Legal Document | 9/8/99 | Jon Doe - Cert | Legal$_A$ Signature Object |
| Multi-Media | 7/9/99 | Jon Doe - Cert | Multi-Media$_A$ Signature Object |

As shown in Table 2, the "User Name" column has been augmented from the is "User Name" column of Table 1 to include a certificate ("Cert") for the user. In one embodiment, a certificate is stored in the record along with the user name. Although the certificate the shown stored in table 2 as part of the user name, the certificate may be stored anywhere for use in generating digital signatures without deviating from the spirit or scope of the invention. For example, the user certificate may be stored in a secure keystore for the user (described below). As described more fully below, the certificate is used by signature generation 130 of RDBMS 120 to sign data as part of the database stored procedure. Also, a shown in Table 2, the "Data" column for the example database table has been augmented to include a signature object for the corresponding data. For example, in the first record, the data, document$_x$, has been modified to include a signature object for document$_x$. As is described more fully below, the signature object provides full functionality to verify, filter, and re-sign the original document (e.g., document$_x$). For example, in response to a query command that identifies record 1 of Table 2, signature verification 150 utilizes document$_x$ signature object to verify both the authenticity of Jon Doe's certificate as well as the authenticity of the contents of document$_x$, and returns, as a response to the query, document$_x$.

Business logic 160 provides full functionality to query database records based on digital signature criteria. Table 3 shows another example database table to illustrate business logic as part of the digital signature service.

TABLE 3

| Data Type | Date Stored | User Name (Certificate) | Data (Signed) |
| --- | --- | --- | --- |
| Legal Document | 10/2/99 | Bob Smith - Cert | Legal$_X$ Signature Object |
| Legal Document | 9/8/99 | Bob Smith - Cert | Legal$_A$ Signature Object |
| Textual Document | 4/3/99 | Bob Smith - Cert | Document$_B$ Signature Object |

For this example, a user submits a query command to receive "all legal documents signed by Jon Doe or Bob Smith." For this example, the RDBMS 120 engine identifies all documents having a "data type" of "legal document", signed by either John Doe or Bob Smith. Using traditional database techniques, the RDBMS 120 engine identifies the second record of Table 2, as well as the first and second records of Table 3. These records are identified because they are of the "Data Type", "Legal Document", and they both are signed, as identified through the "Data Column" by the respective signatories. Accordingly, storing digital signature information in a column of the database table permits use of standard query engines to identify documents digitally signed.

In one embodiment, the digital signature service verifies, during a database transaction, if the signature object or signature certificate is attached to the data as a binary string object. For this embodiment, the digital signature service verifies whether the signature object is the desired signature object for the database transaction by directly checking the signature object. Specifically, the digital signature service matches the signature object against the user login identification, user name, or the name in the query command, so as to determine if the signature object is the desired signature object. This is primarily implemented through code that executes the insert and select SQL commands.

In another embodiment, a column within the database table is defined as the type "digital signature." For this embodiment, the digital signature service verifies, as part of the database transaction, the signature and certificate. For this embodiment, all data stored in a column of the type "digital signature", is assumed to include the signature object. Also, a second field, the "signed field", is defined in the table to signify that the data stored in that row was digitally signed. When the insert procedure is performed, the signed field is updated accordingly. For example, if the user chooses not to sign the data, then an insert is executed for the record and the "signed field" is set to "not signed."

Alternatively, if the user chooses to sign the data, then the signed field is set to signify "signed." When a query is executed for a record, if the signed field is set to "not signed", then the signature verification procedure is not attempted on the data.

Figure 2:
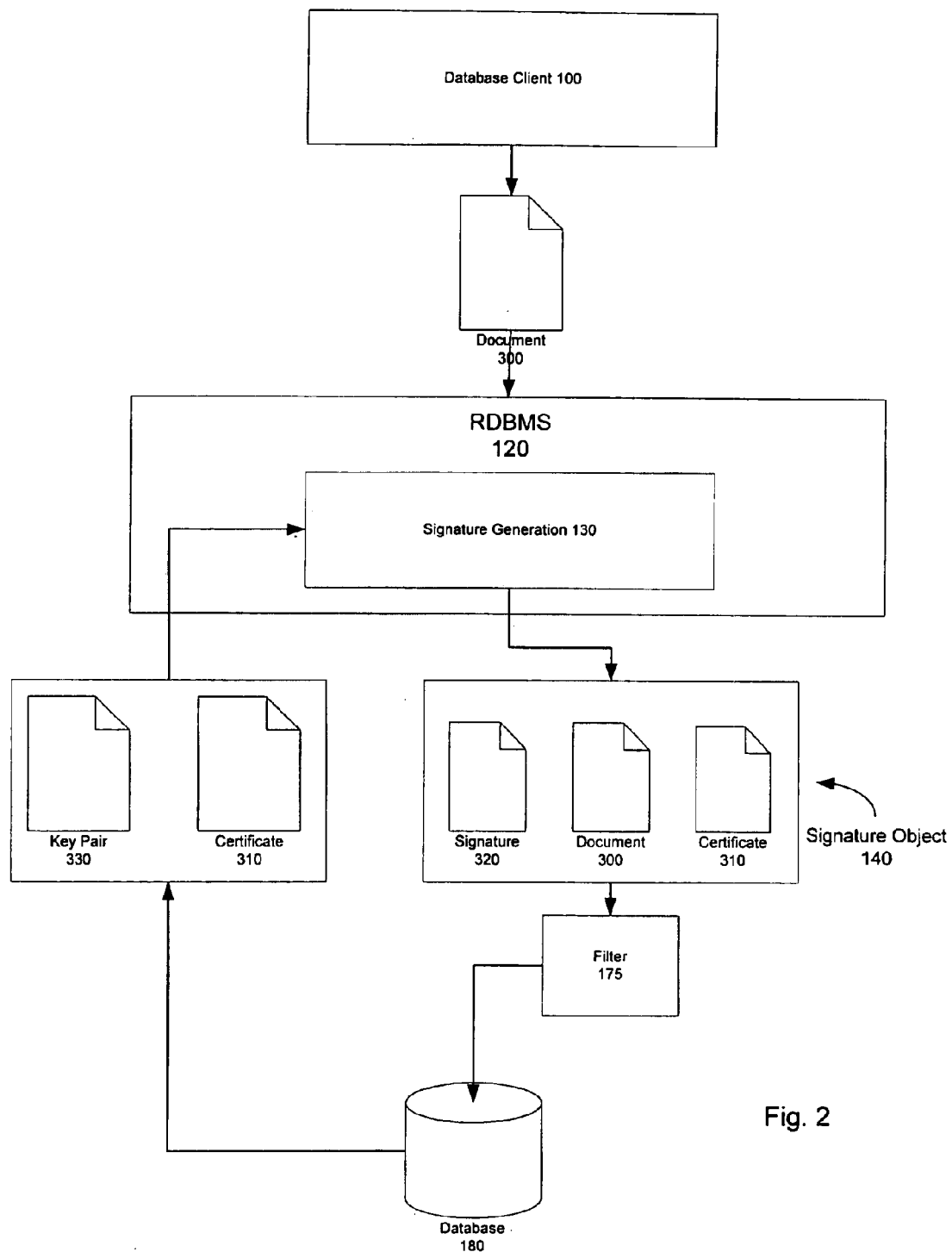
FIG. 2 is a block diagram illustrating one embodiment for implementing digital signatures in a database stored procedure.

FIG. 2 is a block diagram illustrating one embodiment for implementing digital signatures in a database stored procedure. The database client 100 generates a document 300 for storage in database 180. In addition to the standard stored procedure functions performed, signature generation 130 of RDBMS 120 generates signature object 140. Specifically, for this embodiment, signature generation 130 accesses the user's keypair, labeled keypair 330, to generate the signature object 140. As shown in FIG. 2, the signature object 140 comprises the document 300, the user's certificate 310, a signature 320, and additional attributes (not shown). As used herein, the term "document" or "data" generally refers to any file, message, or content of any type that the user wishes to digitally sign. One embodiment for accessing the user's certificate and key pair involves storing the keypair and certificate in the RDMS system database tables. As discussed above, the RDMS database tables are accessed upon user log-in for a database session. In another embodiment, a "keystore" is stored either internal or external to the database. For this embodiment, the keystore holds the user's key pair and certificate, and is accessed for the signing operation. However, additional security procedures are required in the RDMS 120 to ensure protection of the user's keypair and certificate, such that this data is only accessed after the corresponding user has successfully logged on to a database session.

The signature 320 is the encrypted fingerprint or message digest of the document 300. For this embodiment, the digital signature generation 130 obtains the certificate 310 either from the user of database client 100 or directly from a certificate authority. Specifically, the digital signature service or user obtains the certificate, specific to that user, via a Certificate Authority ("CA") based on information provided by the user. The signature object 140 is stored in database 180.

Figure 3:
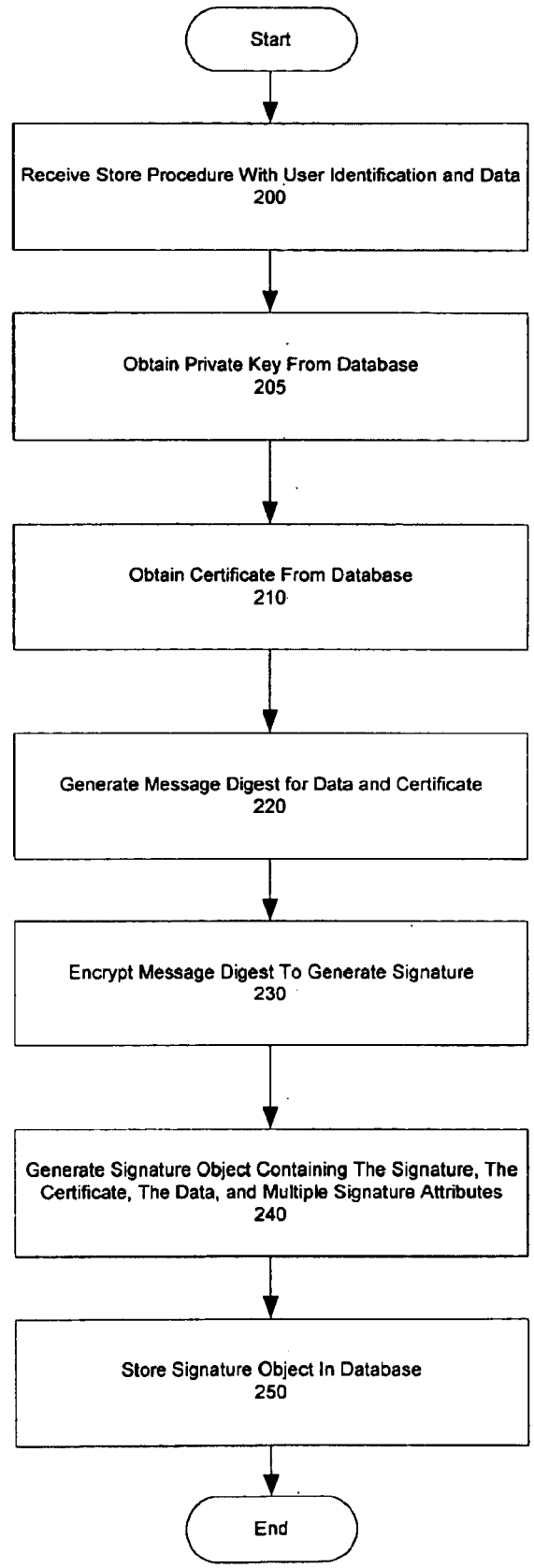
FIG. 3 is a flow diagram illustrating one embodiment for generating a digital signature for a database stored procedure.

FIG. 3 is a flow diagram illustrating one embodiment for generating a digital signature for a database stored procedure. The signing process is initiated when the database (e.g., RDBMS 120) receives the stored procedure with data and user identification (block 200, FIG. 3). First, to create the digital signature, the private key is retrieved from database (or alternatively from the keystore) (block 205, FIG. 3). To obtain the private key from the key store, the database software implements a security procedure to ensure that the private key and certificate are only used for the corresponding user. The certificate is then retrieved from the database (or keystore) (block 210, FIG. 3).

The digital signature service (e.g., signature generation 130, FIG. 1) generates a message digest for the data (block 220, FIG. 3). As is well known in the art, the message digest is a unique fingerprint of the data contents. Any well-known technique for generating message digests may be used by the digital signature service. In one embodiment, the "SHA-1" algorithm is used to generate the message digest. However, any algorithm for generating a message digest, including MD5, etc., may be used without deviating from the spirit and scope of the invention.

To generate the signature, the message digest is encrypted using the private key (block 230, FIG. 3). In one embodiment, the JAVA Developers Kit ("JDK") 1.2, available from Sun Microsystems, provides the necessary functionality to generate a signature. Specifically, in one embodiment, the signature is generated via a SignedObject class. Any algorithm for encrypting the message digest using the private key may be used. In one embodiment, the Digital Signature Algorithm ("DSA") is used to encrypt the message digest. In alternative embodiments, other algorithms, such as DSA, RSA, DES, Triple DES, elliptic curve, etc., may be used.

In one embodiment, once the signature is generated, the digital signature service generates the signature object, as a serialized object (block 240, FIG. 3). In other embodiments, if the database has the ability to store the actual object, then the object is not serialized. The signature object contains the signature, the certificate, the document, and, optionally, additional attributes. The additional signature attributes may include the number of times the file has been signed (e.g., multiple signature attribute). In one embodiment, the multiple signature attribute is used to automate the process for multiple signatures (See FIG. 7). Specifically, the multiple signature attribute allows the digital signature service to track the number of signatures executed on the current signature object. This tracking permits the digital signature service to display the appropriate certificates to the user and to extract the original document. Additional file attributes may be added to the digital signature object.

By combining both the signed object and certificate as a single serialized object, at least two benefits are obtained. First, this process simplifies the verification process on the server by combining all the information in a single signature object. Second, the use of serialized objects provides additional security. Since the information is written to a file as serialized objects, an attempt to intercept the file to replace it with extraneous data would be difficult because the intruder would have to extract the information in exactly the same fashion as it was written to file. Accordingly, this technique minimizes the ability to tamper with the signature object. Once the signature object has been created, the signature object is stored in the database (block 250, FIG. 3).

Figure 4:
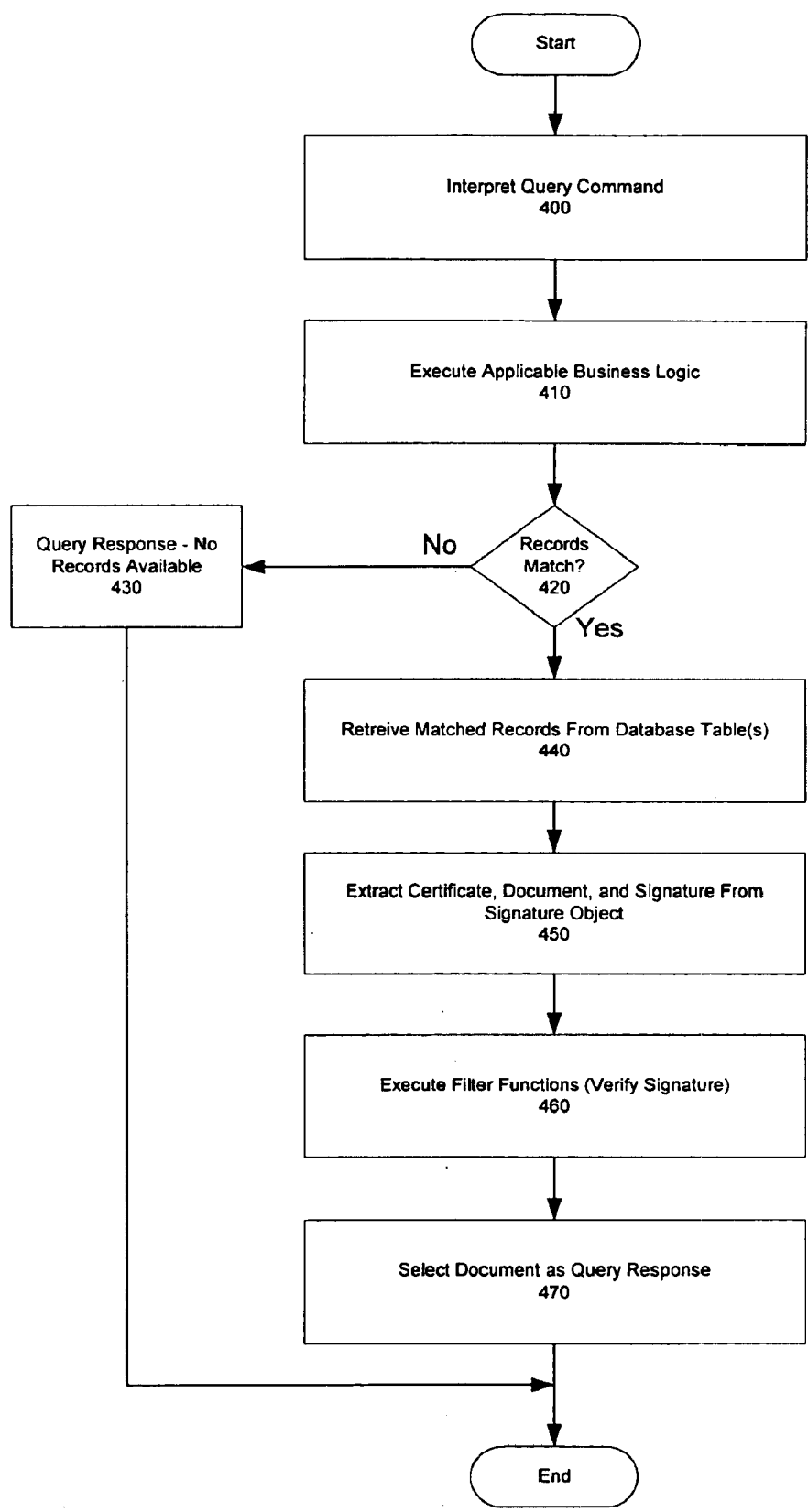
FIG. 4 is a flow diagram illustrating one embodiment for executing a query with the digital signature services embedded in the database engine.

FIG. 4 is a flow diagram illustrating one embodiment for executing a query with the digital signature services embedded in the database engine. The database engine (e.g., RDBMS 120) interprets the query command received from the database client 100 (block 400, FIG. 4). After interpreting the command, any applicable business logic is executed (block 410, FIG. 4). As discussed above, business logic includes any logic in a query that includes digital signature related information as a parameter (e.g., retrieve all documents signed by signatories). If no records in the database are identified in response to the query, then a query response, which identifies that no records are available, is generated (blocks 420 and 430, FIG. 4). Alternatively if at least one record satisfies the query criteria, then the matched record(s) are extracted, including the signature object, from the database table(s) (blocks 420 and 430, FIG. 4). The certificate, document and signature are extracted from the signature object for all corresponding records (block 450, FIG. 4). Additional filter functions, if any, are executed (block 460, FIG. 4). Pending verification of the certificate and signature (See FIG. 6), the document(s) are selected for the query response (block 470, FIG. 4).

Figure 5:
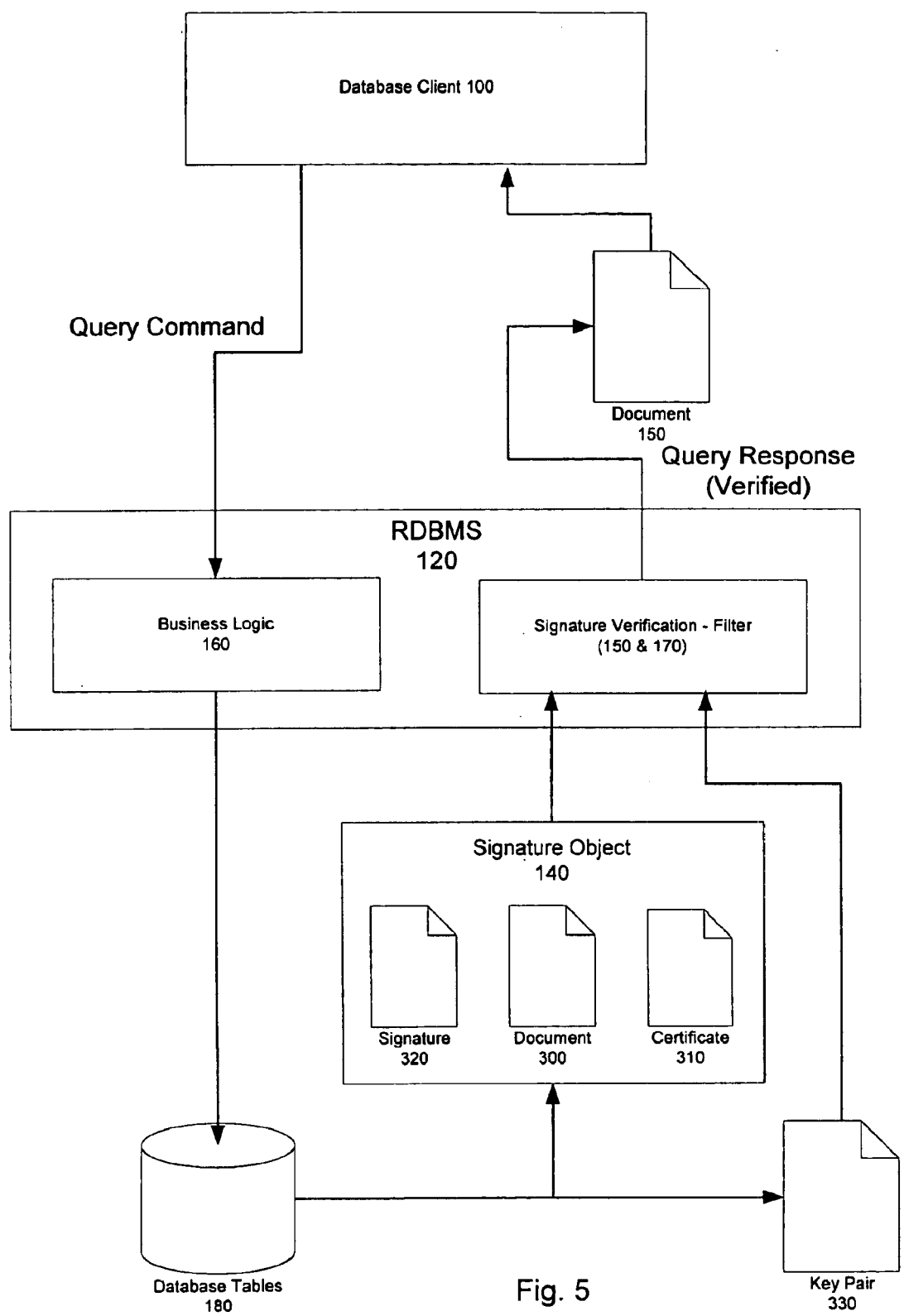
FIG. 5 is a block diagram illustrating one embodiment for data retrieval in a database incorporating the digital signature techniques of the present invention.

FIG. 5 is a block diagram illustrating one embodiment for data retrieval in a database incorporating the digital signature techniques of the present invention. As shown in FIG. 5, a query command is generated by database client 100. Business logic 160 interprets the command regarding requests based on digital signatures. Based on records identified, the key pair 330 for the corresponding signatories of the data are extracted. In addition, the signature object(s) for the record(s) identified are also extracted (e.g., signature object 140 containing signature 320, document 300, and certificate 310). The signature verification and filter (150 and 170) utilize the key pair 330 and signature object 140 to generate, as a response to the query, document 150, including a verification of the digital signature for document 150.

Figure 6:
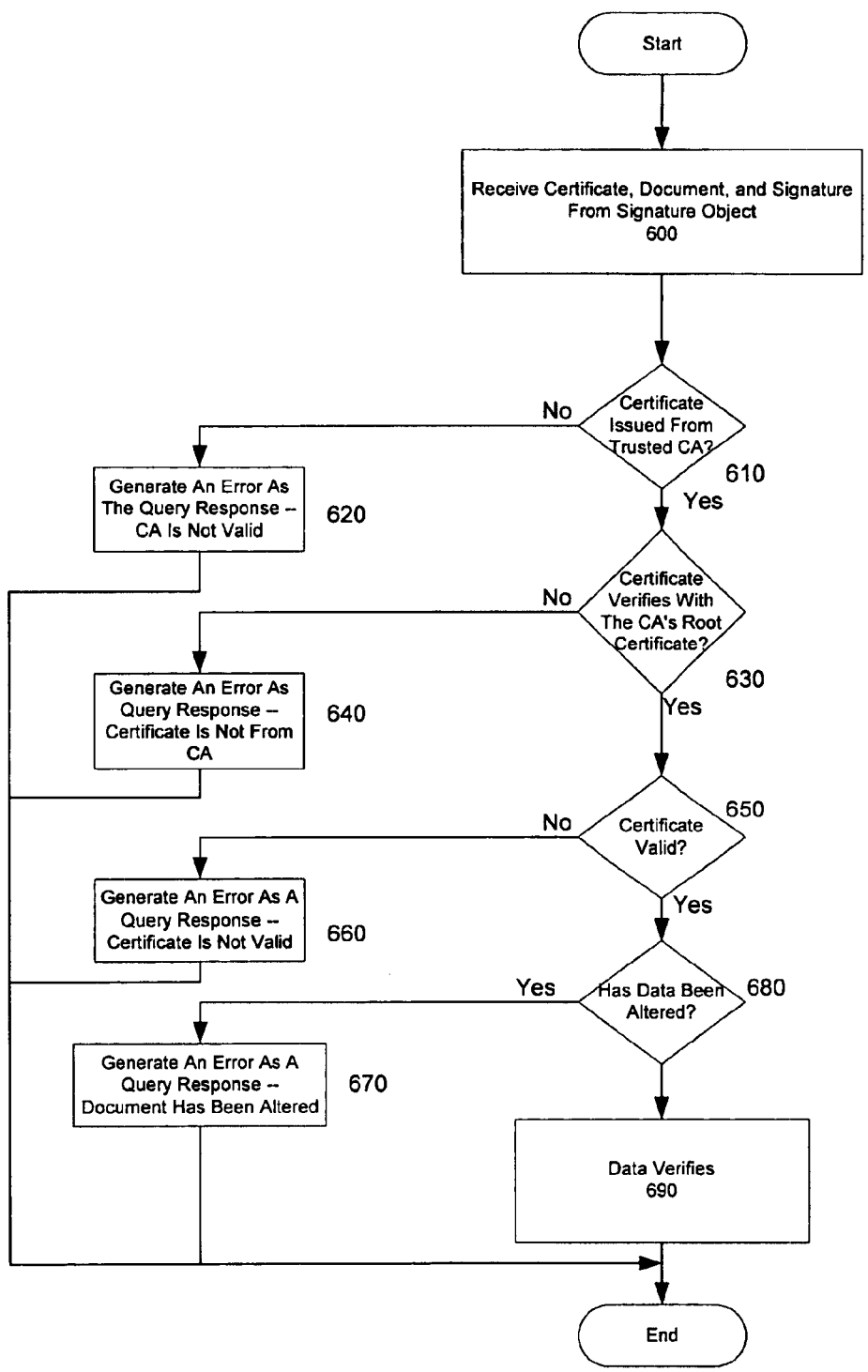
FIG. 6 is a flow diagram illustrating one embodiment for validating digital signatures in a database retrieval process.

FIG. 6 is a flow diagram illustrating one embodiment for validating digital signatures in a database retrieval process. As discussed above in conjunction with a description of the process of FIG. 4, the certificate, document and signature are extracted from the signature object (block 600, FIG. 6) after retrieval from the database. In one embodiment, the digital signature service verifies that the signature is from a trusted certificate authority (block 610, FIG. 6). This eliminates the possibility of unauthorized certificates entering the system. Specifically, the information in the issuer attribute is compared with the information from a list of trusted certificate authorities. If the certificate is not from a trusted certificate authority, then the process is stopped, and an error is reported (block 620, FIG. 6).

Once the certificate is verified as being from a trusted certificate authority, then the validity of the certificate, using the certificate authority's root certificate, is checked (block 630, FIG. 6). This process allows the digital signature service to determine if the signature is truly from the certificate authority listed in the "issuers attribute." To accomplish this, a message digest of the customer's certificate is generated. Then, the message digest contained in the certificate, which was encrypted by the certificate authority's private key, is extracted. The message digest, contained in the customer's certificate, is decrypted using the public key contained in the certificate authority's root certificate. If the customer's certificate cannot be verified using the certificate authority's root certificate, then the verification process is stopped, and an error is reported (block 640, FIG. 6).

The digital signature service then determines whether the certificate is valid for the customer (block 650, FIG. 6). Certificates expire, and certificate authorities revoke them. To check for a valid certificate, the digital signature service determines whether the date range is valid at the time the message is received. The date range is a start and end date that is obtained from the certificate. If the certificate is not valid, then the process is stopped and an error is reported (block 660, FIG. 6). Also, to validate the certificate, a C. R. L. check is executed to insure that the certificate has not been revoked. Specifically, an iterative search through the C. R. L. is performed. If the certificate fails the C. R. L., then the process is halted, and an error is reported.

The next step in the process is to determine whether the document received has been altered (block 680, FIG. 6). The signature is decrypted with the public key, stored as part of the certificate. The decrypted signature yields the message digest. The message digest is then used to determine whether the document has been altered. If it has, then an error is generated, and the process is terminated (block 670, FIG. 6). Also, if the message digest cannot be properly decrypted using the certificate's public key, then the signature or the certificate does not belong to the customer. If this is the case, then either the certificate or signature has been replaced or altered in transit. Regardless, under this scenario, the integrity of the data has been compromised, and the process is halted, and an error is reported. If the certificate's public key successfully decrypted the signature, then the message digest from the signature is compared to the message digest independently generated by the digital signature service. If they match, then the integrity of the document and certificate has been maintained. At this stage, the verification process is complete, and the database system returns the data in response to the query (block 690, FIG. 6).

Multiple Parties Using Digital Signatures

Figure 7:
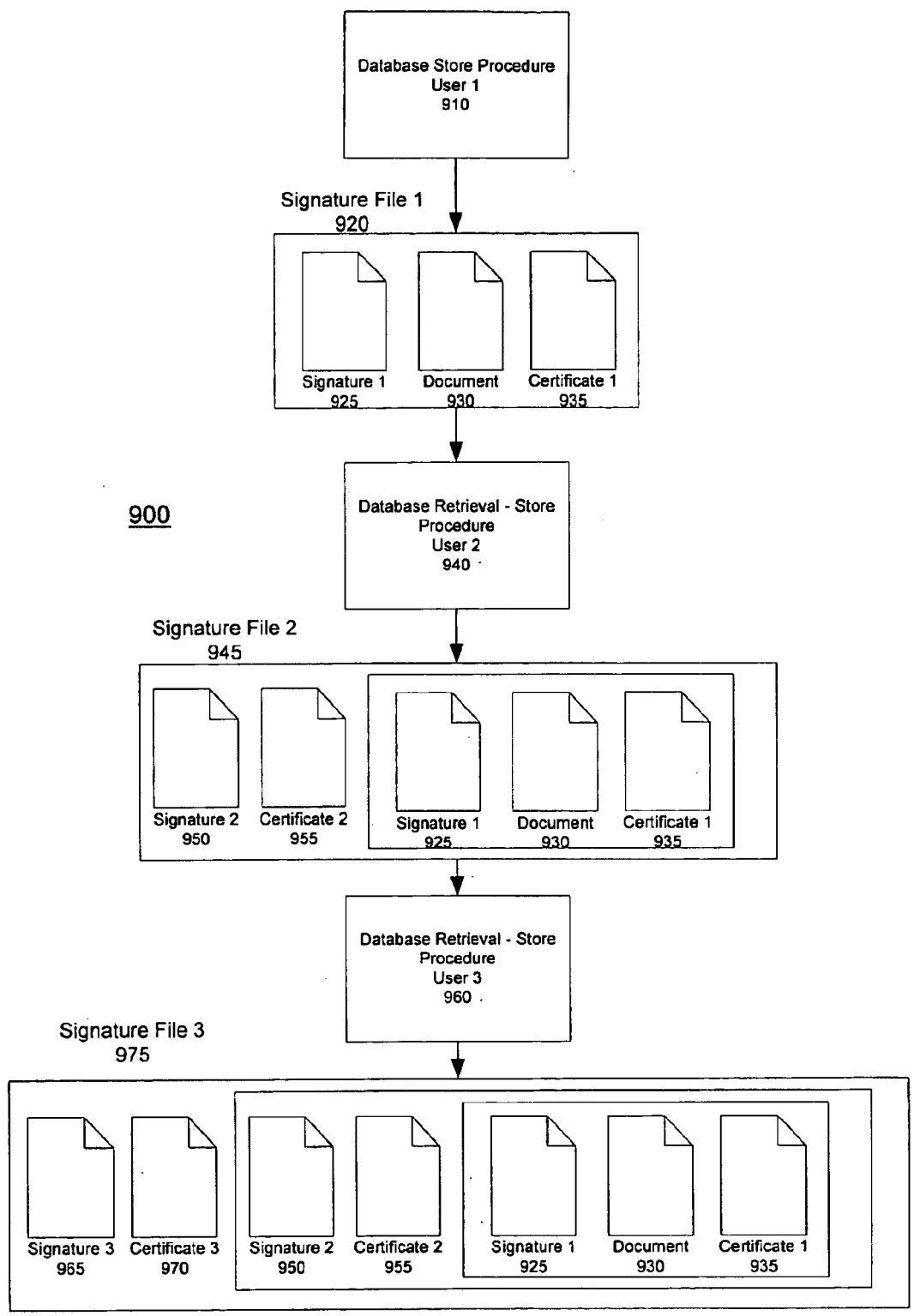
FIG. 7 is a block diagram illustrating one embodiment for implementing multiple signatures through the digital signature service incorporated into a database.

The digital signature service implemented in a database has application for use with multiple users that digitally sign a document. FIG. 7 is a block diagram illustrating one embodiment for implementing multiple signatures through the digital signature service incorporated into a database. For this example, three parties wish to become signatories to a single document, document 930. A first party, designated user 1, obtains a certificate, labeled certificate "1" 935 on FIG. 7. User 1 wants to authenticate and secure, through a digital signature, document 930. To this end, user 1 initiates the digital signature service stored procedure 910 to digitally sign document 930 with user 1's private key to generate signature 925. The three documents, along with any additional file data, constitute signature object "1" 920. The signature object "1" 920 is stored in a record of the database.

User 2, through the digital signature service database retrieval procedure 940, verifies the authenticity of user 1 as well as the contents of the document 930 and certificate "1" 935. If the verification is complete, and user 2 wishes to become a signatory to document 930, then user 2, through the digital signature service database stored procedure 940, signs the entire signature object 1, with user 2's private key to generate signature "2" 950. Again, the entire contents, including the encapsulated signature object "1" 920, certificate "2" 955, and signature "2" 950 comprise signature object 2, along with any additional file data. Note that the entire signature object "1" 920 remains in tact, and user 2, through the digital signature service, encapsulates and signs the entire signature object 920. User 2 stores the signature object "2" 940 in the database.

For this example, user 3 also wishes to become a signatory to document 930 along with user 1 and user 2. To this end, user 3, through the digital signature service database retrieval procedure 960, verifies the authenticity of user 2, with certificate "2" 955 and signature "2" 950, and also verifies the authenticity of user 1, with certificate "1" 955 and signature "1" 925. In addition, user 3, through the digital signature service database retrieval procedure 960, verifies the contents of document 930 with signature "1" 925. If user 3 wishes to become a signatory to document 930, then user 3, using the digital signature service database stored procedure, signs the encapsulated signature object "2" 945 with user 3's private key to generate signature "3" 965. Again, for this embodiment, the entire contents are encapsulated in a signature object "3" 975 for storage in the database (e.g., database on a server). The example of FIG. 7 illustrates the use of the digital signature service for multiple signatories to a single document. Any number of user's signatories may participant using the digital signature service.

Computer and Network Environment

Figure 8:
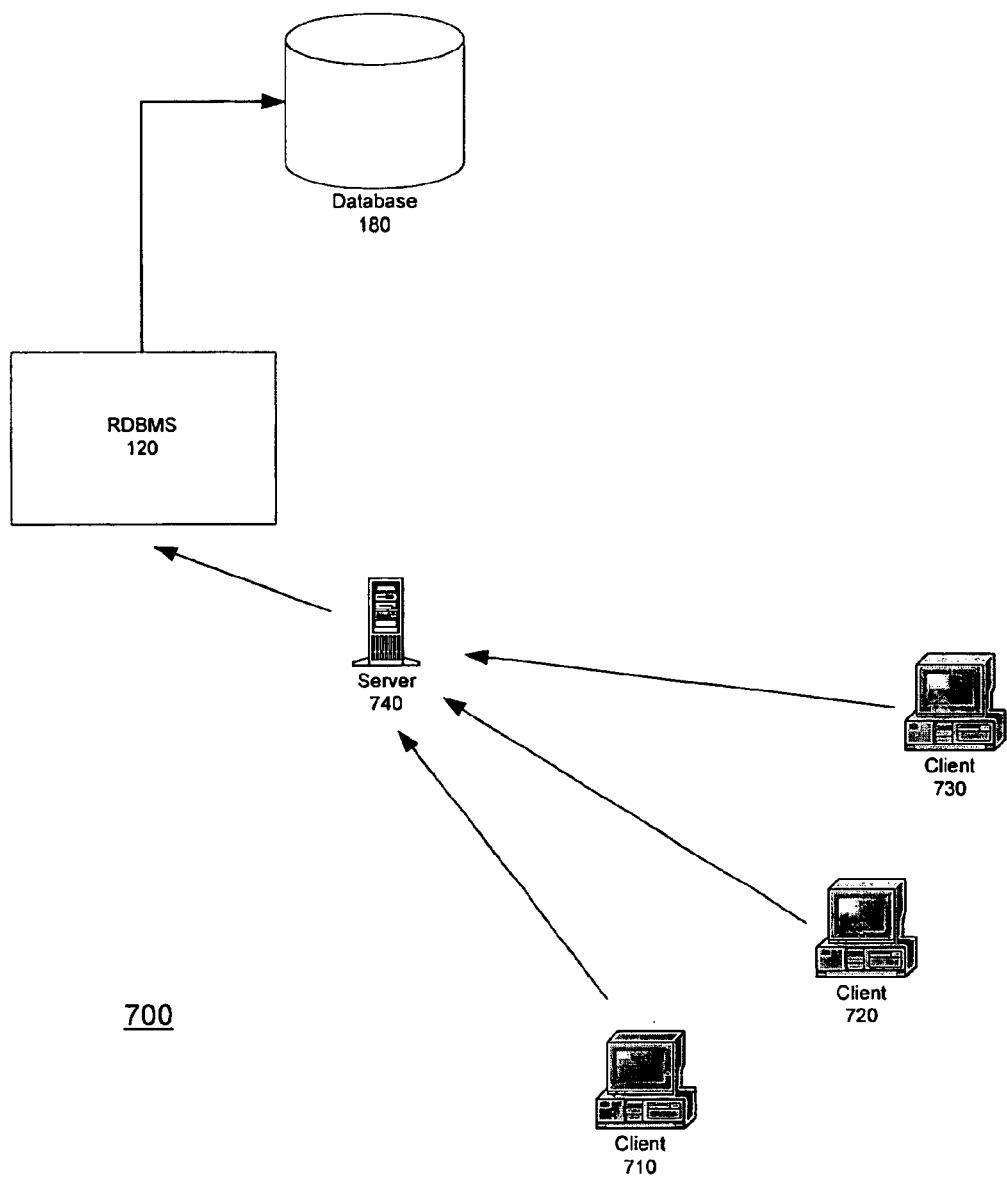
FIG. 8 illustrates a network environment for implementing the database procedures for digital signatures.

FIG. 8 illustrates a network environment for implementing the database procedures for digital signatures. For this example, enterprise 700 includes a plurality of clients (clients 710, 720 and 730) coupled to a server 740. As shown in FIG. 7, for this embodiment, the server 740 operates the RDBMS software 120 for storage of data in database 180. Specifically, clients (clients 710, 720 and 730) store data in database 180 through the client-server environment. For this embodiment, clients, through the digital signature stored procedure, may digitally signed data for storage in database 180. In addition, clients, with proper file authorization, may extract digitally signed documents in a manner described above. Furthermore, the client-server environment of FIG. 8 is conducive to the multiple signature techniques described in FIG. 7 above.

Figure 9:
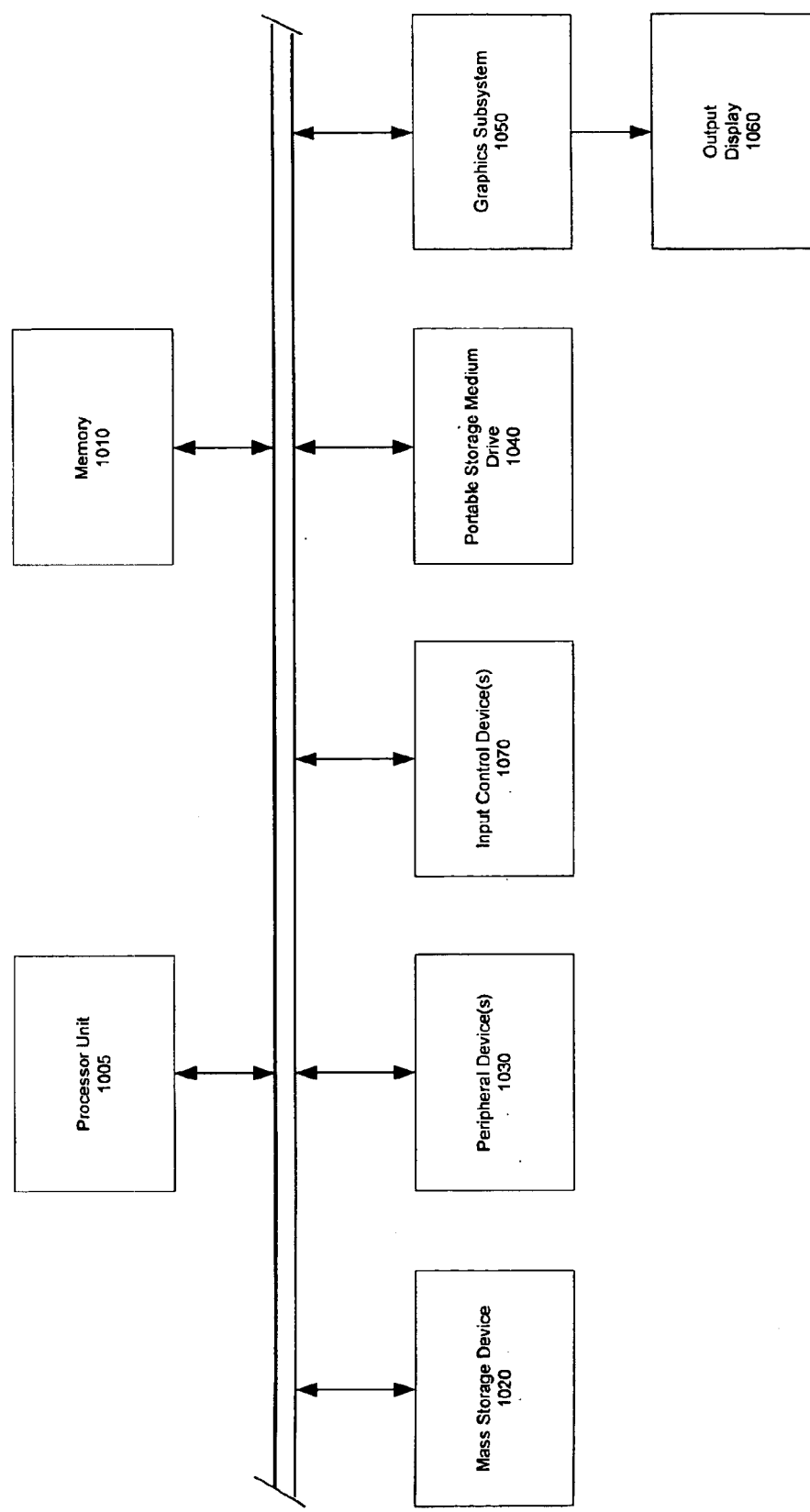
FIG. 9 illustrates a high-level block diagram of a general-purpose computer system for which the digital signature service may operate.

FIG. 9 illustrates a high-level block diagram of a general-purpose computer system for which the digital signature service may operate. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. If the digital signature service system of the present invention is implemented in software, the main memory 1010 stores the executable code when in operation. The main memory 1010 may include banks of dynamic random access memory (DRAM) as well as high-speed cache memory.

The computer system 1000 further includes a mass storage device 1020, peripheral device(s) 1030, portable storage medium drive(s) 1040, input control device(s) 1070, a graphics subsystem 1050, and an output display 1060. For purposes of simplicity, all components in the computer system 1000 are shown in FIG. 9 as being connected via the bus 1025. However, the computer system 1000 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may be implemented with a magnetic disk drive or an optical disk drive, is a non-volatile storage device for storing data and instructions for use by the processor unit 1005. In the software embodiment, the mass storage device 1020 stores the digital signature service system software for loading to the main memory 1010.

The portable storage medium drive 1040 operates in conjunction with a portable non-volatile storage medium, such as a floppy disk or a compact disc read only memory (CD-ROM), to input and output data and code to and from the computer system 1000. In one embodiment, the digital signature service system software is stored on such a portable medium, and is input to the computer system 1000 via the portable storage medium drive 1040. The peripheral device(s) 1030 may include any type of computer support device, such as an input/output (I/O) interface, to add additional functionality to the computer system 1000. For example, the peripheral device(s) 1030 may include a network interface card for interfacing the computer system 1000 to a network.

The input control device(s) 1070 provide a portion of the user interface for a user of the computer system 1000. The input control device(s) 1070 may include an alphanumeric keypad for inputting alphanumeric and other key information, a cursor control device, such as a mouse, a trackball, stylus, or cursor direction keys. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and processes the information for output to the output display 1060. The components contained in the computer system 1000 are those typically found in general purpose computer systems, and in fact, these components are intended to represent a broad category of such computer components that are well known in the art. In addition, the digital signature service may be implemented on a main frame system, and communicate to a user at a terminal unit. Also, the user may operate the digital signature service in a Unix environment, wherein the user's home directory and primary storage resides on another machine, although transparent to the user. Furthermore, the digital signature service may operate via a network computer, configured with minimal processing resources and memory.

The digital signature service system may be implemented in either hardware or software. For the software implementation, the digital signature service is software that includes a plurality of computer executable instructions for implementation on a general-purpose computer system. Prior to loading into a general-purpose computer system, the digital signature service software may reside as encoded information on a computer readable medium, such as a magnetic floppy disk, magnetic tape, and compact disc read only memory (CD-ROM). In one hardware implementation, the digital signature service system may comprise a dedicated processor including processor instructions for performing the functions described herein. Circuits may also be developed to perform the functions described herein.

Although the present invention has been described in terms of specific exemplary embodiments, it will be appreciated that various modifications and alterations might be made by those skilled in the art without departing from the spirit and scope of the invention.

What is claimed is:

1. A method for integrating a digital signature service into a database, said method comprising the steps of:
   storing a database comprising a plurality of records;
   receiving a store procedure with data from a client of said database;
   in response to said store procedure;
      receiving a digital certificate for said client;
      receiving a private key for said client;
      generating a signature from said data, digital certificate and private key of said claim;
      generating a signature object for said data, said digital signature object comprising said data, certificate and signature; and
      storing said signature object as at least a portion of one of said records in said database.

2. The method as set forth in claim 1, further comprising the steps of:
   receiving a query command from said user to retrieve said data from said record of said database table;
   retrieving, in response to said query command, said data, certificate and signature for said user;
   processing said data and said certificate, using said signature, to verify that said data and said certificate are unaltered from their original contents;
   obtaining, from said certificate, an authentication as to the digital signatory; and
   generating, as a response to said query command, said data, so as to provide verification of said data with said signature and said certificate in response to said query.

3. The method as set forth in claim 2, further comprising the steps of:
   receiving, as said query command, a query command to retrieve at least one record in said database comprising criteria based on digital signatures stored for said records;
   identifying records in said database with said criteria regarding said digital signatures; and
   retrieving said records identified in response to said query command.

4. The method as set forth in claim 3, further comprising the steps of:
   extracting, from said records retrieved, data, certificate and signature stored in said record;
   processing said data and said certificate, using said signature, to verify that said data and said certificate are unaltered from their original contents;
   obtaining, from said certificate, an authentication as to the digital signatory of said data; and
   generating, as a response to said query command, said data, so as to provide verification of said data with said signature and said certificate in response to said query.

5. The method as set forth in claim 1, wherein:
   the step of generating a digital signature for said data comprises the step of generating a single signature object comprising said certificate, said document, and said digital signature; and
   the step of storing said document, certificate and signature as at least a portion of a record in said database comprises the step of storing said single signature object in said record of said database.

6. The method as set forth in claim 5, wherein the step of generating a single signature object comprises the step of generating a serialized object comprising said certificate, said document, and said signature.

7. The method as set forth in claim 1, further comprising the step of storing said certificate of said user in a column of said database table.

8. The method as set forth in claim 7, wherein the step of storing said certificate of said user in a column of said database table comprises the step of augmenting a user identification field to include said certificate of said user.

9. The method as set forth in claim 1, further comprising the steps of:
   receiving a second digital certificate for a second client;
   retrieving said signature object from said record in said database as a first signature object;
   generating a second signature from said first signature object with said second client as a signatory;
   generating a second signature object, said second signature object comprising said first signature object, said second certificate, and said second signature; and
   storing, in said database, said second signature object.

10. The method as set forth in claim 9, further comprising the steps of:
    receiving a query command to retrieve said second signature object from said record of said database table;
    retrieving, in response to said query command, said second signature object for said user;
    processing said first signature object and said second certificate, using said second signature, to verify that said first signature object and said second certificate are unaltered from their original contents;
    processing said data and said certificate, using said signature, to verify that said data and said certificate are unaltered from their original contents; and
    generating, as a response to said query command, said data, so as to provide verification of said first and second digital signatures.

11. A computer readable medium comprising a plurality of instructions which, when executed by a computer, cause the computer to perform the steps of:

storing a database comprising a plurality of records;

receiving a store procedure with data from a client of said database;

in response to said store procedure;
   receiving a digital certificate for said client;
   receiving a private key for said client;
   generating a signature from said data, digital certificate and private key of said client;
   generating a signature object for said data, said digital signature object comprising said data, certificate and signature; and
   storing said signature object as at least a portion of one of said records in said database.

12. The computer readable medium as set forth in claim 11, further comprising the steps of:
   receiving a query command from said user to retrieve said data from said record of said database table;
   retrieving, in response to said query command, said data, certificate and signature for said user;
   processing said data and said certificate, using said signature, to verify that said data and said certificate are unaltered from their original contents;
   obtaining, from said certificate, an authentication as to the digital signatory; and
   generating, as a response to said query command, said data, so as to provide verification of said data with said signature and said certificate in response to said query.

13. The computer readable medium as set forth in claim 12, further comprising the steps of:
   receiving, as said query command, a query command to retrieve at least one record in said database comprising criteria based on digital signatures stored for said records;
   identifying records in said database with said criteria regarding said digital signatures; and
   retrieving said records identified in response to said query command.

14. The computer readable medium as set forth in claim 13, further comprising the steps of:
   extracting, from said records retrieved, data, certificate and signature stored in said record;
   processing said data and said certificate, using said signature, to verify that said data and said certificate are unaltered from their original contents;
   obtaining, from said certificate, an authentication as to the digital signatory of said data; and
   generating, as a response to said query command, said data, so as to provide verification of said data with said signature and said certificate in response to said query.

15. The computer readable medium as set forth in claim 11, wherein:
   the step of generating a digital signature for said data comprises the step of generating a single signature object comprising said certificate, said document, and said digital signature; and
   the step of storing said document, certificate and signature as at least a portion of a record in said database comprises the step of storing said single signature object in said record of said database.

16. The computer readable medium as set forth in claim 15, wherein the step of generating a single signature object comprises the step of generating a serialized object comprising said certificate, said document, and said signature.

17. The computer readable medium as set forth in claim 11, further comprising the step of storing said certificate of said user in a column of said database table.

18. The computer readable medium as set forth in claim 17, wherein the step of storing said certificate of said user in a column of said database table comprises the step of augmenting a user identification field to include said certificate of said user.

19. The computer readable medium as set forth in claim 11, further comprising the steps of:
   receiving a second digital certificate for a second client;
   retrieving said signature object from said record in said database as a first signature object;
   generating a second signature from said first signature object with said second client as a signatory;
   generating a second signature object, said second signature object comprising said first signature object, said second certificate, and said second signature; and
   storing, in said database, said second signature object.

20. The computer readable medium as set forth in claim 19, further comprising the steps of:
   receiving a query command to retrieve said second signature object from said record of said database table;
   retrieving, in response to said query command, said second signature object for said user;
   processing said first signature object and said second certificate, using said second signature, to verify that said first signature object and said second certificate are unaltered from their original contents;
   processing said data and said certificate, using said signature, to verify that said data and said certificate are unaltered from their original contents; and generating, as a response to said query command, said data, so as to provide verification of said first and second digital signatures.

21. A computer comprising:
   an input device for receiving a digital certificate and a private key for a user of said computer;
   database client for generating a store procedure with data;
   database management system, coupled to said database client, for generating, in response to said store procedure, a signature from said data, said database management system further for generating a signature object for said data, digital certificate and private key of said database client, said digital signature object comprising said data, certificate and signature; and
   database, coupled to said database management system, comprising a plurality of records for storing said signature object as at least a portion of a record.

* * * * *